US007924821B2

(12) United States Patent
Shi

(10) Patent No.: US 7,924,821 B2
(45) Date of Patent: Apr. 12, 2011

(54) METHOD AND COMMUNICATION SYSTEM FOR IMPLEMENTING CALLING TAPPING AT FLASH

(75) Inventor: Youzhu Shi, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1292 days.

(21) Appl. No.: 11/481,600

(22) Filed: Jul. 5, 2006

(65) Prior Publication Data

US 2007/0071183 A1 Mar. 29, 2007

(30) Foreign Application Priority Data

Jul. 5, 2005 (CN) .......................... 2005 1 0080485

(51) Int. Cl.
*H04L 12/66* (2006.01)
*H04M 1/64* (2006.01)
(52) U.S. Cl. ........................ 370/352; 379/67.1; 379/69
(58) Field of Classification Search .................... 70/352; 379/67.1, 69
See application file for complete search history.

(56) References Cited

U.S. PATENT DOCUMENTS

| 4,476,349 | A | 10/1984 | Cottrell et al. |
| 4,866,758 | A | 9/1989 | Heinzelmann |
| 5,475,737 | A | 12/1995 | Garner et al. |
| 6,389,276 | B1 | 5/2002 | Brilla et al. |
| 6,891,934 | B1 | 5/2005 | Gao et al. |
| 7,492,872 | B1 | 2/2009 | Di Carlo et al. |
| 7,640,326 | B2 | 12/2009 | Sharma et al. |
| 2005/0047423 | A1 | 3/2005 | Kaul |
| 2005/0074109 | A1 | 4/2005 | Hanson et al. |
| 2005/0111635 | A1 | 5/2005 | Caputo et al. |
| 2005/0111646 | A1 | 5/2005 | Bishop et al. |
| 2005/0180548 | A1* | 8/2005 | Moore ...................... 379/88.12 |
| 2005/0190744 | A1* | 9/2005 | Sun et al. ...................... 370/352 |
| 2006/0135166 | A1* | 6/2006 | Sylvain ...................... 455/445 |

FOREIGN PATENT DOCUMENTS

| CN | 1272997 A | 11/2000 |
| CN | 1407445 | 4/2003 |
| CN | 1476220 | 2/2004 |
| WO | 03/085944 | 10/2003 |

OTHER PUBLICATIONS

English Abstract of CN 1476220 dated Feb. 18, 2004.
English Abstract of CN 1407445 dated Apr. 2, 2003.

(Continued)

*Primary Examiner* — Pankaj Kumar
*Assistant Examiner* — Lonnie Sweet

(57) ABSTRACT

The invention discloses a method for implementing Calling Tapping at Flash, which includes the steps of: when there is a new voice message for a user, actively initiating an SIP message carrying the description information of the voice message by a Voice Mail Application Server; sending the SIP message to the user terminal or the home network device of the user by the Voice Mail Application Server, and notifying the user by the user terminal or the network device; converting the SIP message into an inter-exchange signaling message in CS domain and transmitting it to the CS domain where the user accesses by a Media Gateway Control Unit (MGCU), and notifying the user by a switching control unit in the CS domain in accordance with the prompt means of Calling Tapping at Flash of the user. The invention also discloses a communication system for implementing Calling Tapping at Flash service.

7 Claims, 3 Drawing Sheets

OTHER PUBLICATIONS

Draft ETSI TS <3024> V<0.0.113>:Telecommunications and Internet Converged Services and Protocols for Advanced Networking (TISPAN); NGN Signalling Control Protocol;Message Waiting Indication (MWI)PSTN/ISDN simulation services, dated Oct. 2005, total 34 pages.

Draft ETSI TS <3024> V<0.0.14> :Telecommunications and Internet Converged Services and Protocols for Advanced Networking (TISPAN);NGN Signalling Control Protocol;Message Waiting Indication (MWI)PSTN/ISDN simulation services,dated Oct. 2005, total 34 pages.

3GPP2 N.S 0024-0 version 1.0:Network Support for MDN-Based Message Centers, dated Nov. 2000, total 24 pages.

Office action issued in corresponding Chinese patent application No. 200680012273.1, dated Sep. 25, 2009; and partial English translation thereof; total 8 pages.

Office action issued in corresponding Chinese patent application No. 200680012273.1, dated Jun. 29, 2010; and partial English translation thereof; total 8 pages.

Written opinion issued in corresponding PCT application No. PCT/CN2006/001180, dated Sep. 21, 2006; total 3 pages.

Rfc3525:Gateway Control Protocol Version 1,dated Jun. 2003, total 160 pages.

Office action issued in corresponding European patent application No. 06013740.3, dated Jan. 24, 2011; total 5 pages.

Cisco systems, Inc: "Configuring SIP MWI Features", dated May 27, 2004, total 24 pages.

* cited by examiner

METHOD AND COMMUNICATION SYSTEM FOR IMPLEMENTING CALLING TAPPING AT FLASH

FIELD OF THE INVENTION

The invention relates to communication technology field, especially to a method and a communication system for implementing Calling Tapping at Flash.

BACKGROUND OF THE INVENTION

Message Waiting Indication (MWI) service is a widely used supplementary service. When there is an unheard voice message in a user's voice mailbox, the voice mailbox will prompt the user for a new voice message. After the user has heard the new voice message from the voice mailbox, the prompt will disappear automatically. The prompt is usually provided by either of the following two means:

Go off hook to listen for cue tone: when the user goes off the hook, he/she will receive a special dial tone or a voice prompt, to inform him/her there is a new voice message.

Display on telephone interface: the Calling Tapping at Flash indicator on the user's telephone flashes or the new voice message is displayed on the screen of the telephone (which requires the support of the telephone).

MWI service is also called Message Waiting Notification (MWN) service in some cases; in this document, it is referred to as Calling Tapping at Flash service collectively.

As packet switching technologies become matured increasingly, legacy CS-based telecommunication networks are evolving towards PS-based broadband telecommunication networks. In a packet voice network, Calling Tapping at Flash service is also a fundamental supplementary service, as specified in ETSI's Draft ETSI TS <03024>V<0.0.6> (2005-03) "Telecommunications and Internet Converged Services and Protocols for Advanced Networking (TISPAN); NGN Signaling Control Protocol; Message Waiting Indication (MWI) PSTN/ISDN simulation services". The target network of the Draft is the packet core network with Session Initiation Protocol (SIP) as the call control signaling, for which ETSI is establishing the standard.

In the current version of the Draft, a method for implementing Calling Tapping at Flash service with SIP SUBSCRIBE/NOTIFY message mechanism is provided: the SIP terminal initiates a voice message subscription to the Voice Mail Application Server with an SIP SUBSCRIBE message; once there is a new voice message in the voice mailbox of the SIP terminal user, the Voice Mail Application Server notifies the SIP terminal with an SIP NOTIFY message.

In the Draft, the above method of implementing Calling Tapping at Flash service is limited to the following application case: the user terminal is an SIP terminal that can initiate a subscription of voice message event packets, while the voice mailbox is an SIP Application Server in PS domain.

However, for a practically operative packet voice telecommunication network, legacy terminals such as POTS terminals and ISDN terminals can also access the packet core network with SIP as the call control signaling by a certain access means and become registered users of the packet core network. It is evident that those terminals are unable to initiate subscriptions of voice message event packets but have to employ a network device to initiate subscriptions of voice message event packets to the Voice Mail Application Server on behalf of them.

For example, the supplementary service control unit for handling legacy supplementary service of a Plain Ordinary Telephone Service (POTS) terminal user has to initiate a subscription of voice message event packet to the Voice Mail Application Server for the POTS terminal user who has activated the Voice Mail service or activated the Calling Tapping at Flash service, with the subscriber as the POTS terminal user identity and the routing address of the supplementary service control unit included in the signaling path of the SUBSCRIBE message; after the supplementary service control unit receives a NOTIFY message containing a voice message event packet from the Voice Mail Application Server, it has to treat the voice message appropriately in accordance with the prompt means of user (either of the means mentioned above).

On the other hand, if the operator possesses both legacy CS domain and PS domain, the operator may configure the voice mailboxes of users accessing legacy CS domain in the PS domain after a new Voice Mail Application Server is provided for the PS domain, in consideration of maintenance cost. In that case, it is obvious that the above SUBSCRIBE/NOTIFY solution for voice message event packets can not be implemented, because there is not any network device in the legacy CS domain which can initiate a subscription of voice message event packet to the Voice Mail Application Server on behalf of the users in the legacy CS domain.

Actually, even for a new packet voice telecommunication network of the operator, the SIP terminal users accessing the new network are generally switched from the legacy CS domain. However, the Voice Mail System in legacy CS domain does not need voice message subscription; instead, once there is a new voice message for a subscribed user, it transfers the new voice message for the subscribed user in an ISDN User Part (ISUP) message or a SMS message; whereas, after the user is switched from the legacy CS domain to the PS domain and uses an SIP terminal, he/she has to initiate a subscription request from the SIP terminal to obtain new voice messages.

On the other hand, when the operator constructs a new packet voice telecommunication network, the operator usually needs to utilize the Voice Mail System in the legacy CS domain during the transition stage; that is to say, the voice mailboxes of PS users are located in the legacy CS domain. At that time, if a PS user intends to subscribe voice message event packets, the SUBSCRIBE message for the subscription will be terminated by the Media Gateway Control Unit (MGCU) between the PS domain and the legacy CS domain, and the MGCU has to create and manage a corresponding subscription instance for the user; when the MGCU receives an ISUP call containing voice message indication from the Voice Mail System in the legacy CS domain, MGCU has to convert the ISUP call into a NOTIFY message and send the NOTIFY message to the PS user for whom a subscription instance has been created.

Even SIP terminal users in the PS domain have to initiate subscriptions of voice message event packets through the SIP terminal interface, in order to use the Calling Tapping at Flash service.

It is seen from the above analysis, that in the implementation scheme of the Calling Tapping Flash service provided in ETSI Draft, various possible cases are not considered; as the result, it is impossible to implement the scheme for voice message event packets based on SUBSCRIBE/NOTIFY mechanism if the user is located in the legacy CS domain while the voice mailbox is located in the PS domain;

the supplementary service control unit in PS domain and the MGCU are required to create and manage subscription instances of voice message event packets, resulting in increased memory overhead and reduced processing capacity;

SIP terminals (interfaces) are required to support subscription of voice message event packets; therefore, the implementation of the Calling Tapping at Flash service has to rely on the support of telephone feature and is difficult to generalize;

SIP users switched from legacy CS domain to PS domain are required to subscribe voice message event packets before they can use the Calling Tapping at Flash service, which brings inconvenience to user operations and uses; and In order to keep the subscription instances of the voice message event packets valid permanently, both the SIP terminal and the supplementary service control unit have to update the subscription instances periodically by resending SUBSCRIBE messages, resulting in additional system load.

SUMMARY OF THE INVENTION

The present invention aims to provide a method and a communication system for implementing Calling Tapping at Flash, so as to implement Calling Tapping at Flash service, simplify processing procedures, and facilitate user operations. The method and the communication system adapt to various possible cases.

In one aspect of the present invention, it provides a method for implementing Calling Tapping at Flash, including the following steps of:

when there is a new voice message for a user, actively initiating a Session Initiation Protocol (SIP) message which carries the description information of the new voice message by a Voice Mail Application Server;

sending the SIP message to a user terminal or a home network device of the user terminal, and notifying the user by the user terminal or the home network device.

The method for implementing Calling Tapping at Flash further includes:

converting the SIP message into an inter-exchange signaling message of CS domain and transmitting the inter-exchange signaling message to the CS domain where the user accesses by a Media Gateway Control Unit (MGCU), and notifying the user in accordance with the prompt means of Calling Tapping at Flash of the user by a switching control unit in the CS domain.

When the user is an SIP terminal user in PS domain, the SIP message is sent to the SIP terminal by a call session control unit in the PS domain; the description information of the voice message is abstracted from the SIP message and displayed by the SIP terminal.

When the user is a terminal user in PS domain, said notifying the user comprises the following steps of:

triggering the SIP message to a supplementary service control unit by a call session control unit in the PS domain;

determining the prompt means of Calling Tapping at Flash of the user by the supplementary service control unit;

when the prompt means is "display on telephone interface", transmitting the SIP message to an SIP user agent node by the supplementary service control unit, parsing the SIP message and sending a prompt message by the SIP user agent node to the user terminal; and when the prompt means is "go off hook to listen for cue tone", recording the description information of the voice message in the SIP message in accordance with the presubscribed off-hook signal event by the supplementary service control unit; playing the cue tone for the voice message when the user goes off the hook.

After the user activates Calling Tapping at Flash service, subscribing an off-hook signal event to the user by the supplementary service control unit when it is determined by the supplementary service control unit that the prompt means of Calling Tapping at Flash of the user is "go off hook to listen for cue tone".

The description information of the voice message carried in the SIP message is in Multipurpose Internet Mail Extensions (MIME) format.

The SIP message is a MESSAGE message or an INVITE message.

When the SIP message sent by the Voice Mail Application Server is an INVITE message, abstracting the description information of the voice message from the INVITE message and then releasing the session by the network device in PS domain which receives the INVITE message; or converting the INVITE message into an inter-exchange signaling message by the MGCU; abstracting the parameter for the voice message from the inter-exchange signaling message and then releasing the call by a switching control unit in CS domain when the inter-exchange signaling message is received by the switching control unit; or releasing the session by the Voice Mail Application Server when the SIP response code for the INVITE message is received at the Voice Mail Application Server.

The SDP attribute description of the INVITE message and the SDP attribute descriptions of the subsequent SIP messages of the same session are blank or invalid.

The inter-exchange signaling message is an Initial Address Message (IAM) of ISDN User Part (ISUP).

In another aspect of the present invention, it provides a method for implementing Calling Tapping at Flash, including the following steps of:

When there is a new voice message in a subscribed user's voice mailbox in CS domain, sending an inter-exchange signaling message carrying the description information of the voice message by the voice mailbox to the user;

receiving the inter-exchange signaling message and notifying the user of the new voice message by a switching control unit in the CS domain; or converting the inter-exchange signaling message into a Session Initiation Protocol (SIP) message carrying the description information of the voice message and sending the SIP message to PS domain by a Media Gateway Control Unit (MGCU) between the PS domain and the CS domain; the SIP message being sent to the user terminal or the home network device of the user terminal; notifying the user of the voice message by the user terminal or the home network device of the user terminal through an appropriate approach.

When the user is an SIP terminal user in the PS domain, sending the SIP message to the SIP terminal by a call session control unit in the PS domain; abstracting the description information from the SIP message and displaying the description information by the SIP terminal.

When the user is a terminal user in the PS domain, said notifying the user comprises the following steps of:

triggering the SIP message by the call session control unit in the PS domain to a supplementary service control unit;

determining the prompt means of Calling Tapping at Flash of the user by the supplementary service control unit;

when the prompt means is "display on telephone interface", transmitting the SIP message to an SIP user agent node by the supplementary service control unit, parsing the SIP message and sending a prompt message to the user terminal by the SIP user agent node;

when the prompt means is "go off hook to listen for cue tone", recording the description information in the SIP message in accordance with the presubscribed off-hook signal event by the supplementary service control unit; playing the cue tone for the voice message when the user goes off the hook.

After the user activates Calling Tapping at Flash service, subscribing an off-hook signal event to the user by the supplementary service control unit when it is determined by the supplementary service control unit that the prompt means of Calling Tapping at Flash of the user is "go off hook to listen for cue tone".

The description information of the voice message carried in the SIP message is in Multipurpose Internet Mail Extensions (MIME) format.

The SIP message is a MESSAGE message or an INVITE message.

when the SIP message sent by the MGCU is an INVITE message, abstracting the description information of the voice message from the INVITE message and then releasing the session by a network device in PS domain when the INVITE message is received by the network device; or releasing the session by the MGCU when the SIP response code for the INVITE message is received by the MGCU; or translating the SIP response code of the INVITE message into an appropriate ISUP message by the MGCU; releasing the call when the ISUP message is received by the voice mailbox.

The SDP attribute description of the INVITE message and the Session Description Protocol (SDP) attribute descriptions of the subsequent SIP messages of the same session are blank or invalid.

The inter-exchange signaling message is an Initial Address Message (IAM) of ISDN User Part (ISUP).

In a further aspect of the present invention, it provides a communication system for implementing Calling Tapping at Flash service; the communication system involves PS domain and CS domain; wherein the communication system includes:

a Voice Mail Application Server, located in PS domain, designed to actively send to a user an SIP message carrying the description information of a new voice message for the user when it receives the new voice message;

a call session control unit, located in the PS domain, designed to forward the SIP message to a corresponding network device;

a supplementary service control unit, located in the PS domain, designed to receive the SIP message triggered by the call session control unit and notify the user of the new voice message by an appropriate means in accordance with the prompt means of Calling Tapping at Flash of the legacy terminal user in the PS domain;

a Media Gateway Control Unit (MGCU), designed to convert the SIP message forwarded by the call session control unit into an inter-exchange signaling message of CS domain, and send the inter-exchange signaling message to the CS domain; and a switching control unit, located in the CS domain, designed to receive the inter-exchange signaling message and notify the user of the new voice message.

The supplementary service control unit and the call session control unit are separate network entities or the same network entity; or the call session control unit and the MGCU are separate network entities or the same network entity; or the MGCU and the switching control unit are separate network entities or the same network entity.

In yet another aspect of the present invention, it provides a communication system for implementing Calling Tapping at Flash service; the communication system involves PS domain and CS domain; wherein the communication system includes:

a voice mailbox, located in CS domain, designed to actively send to a user an inter-exchange signaling message carrying the description information of a new voice message for the user when it receives the new voice message;

a switching control unit, located in the CS domain, designed to send the inter-exchange signaling message to PS domain when it judges the user is a user in PS domain;

a Media Gateway Control Unit (MGCU), designed to convert the inter-exchange signaling message to an SIP message;

a call session control unit, located in the PS domain, designed to forward the SIP message to a corresponding network device; and a supplementary service control unit, located in the PS domain, designed to receive the SIP message triggered by the call session control unit and notify the user of the new voice message by an appropriate means in accordance with the prompt means of Calling Tapping at Flash of the legacy terminal user in PS domain.

The supplementary service control unit and the call session control unit are separate network entities or the same network entity; or the call session control unit and the MGCU are separate network entities or the same network entity; or the MGCU and the switching control unit are separate network entities or the same network entity.

It is seen from the above that the invention provides a new method of implementing Calling Tapping at Flash service in PS domain, i.e., the voice message information is transmitted via a MIME body contained in an SIP message; the MIME body can be transmitted with bodies of various SIP messages and the subscription for the voice message is not needed.

The invention has taken into account various possible cases: if the user is in the legacy CS domain while the voice mailbox is in the PS domain, the Voice Mail Application Server can actively initiate an SIP session, with the body of an SIP message containing an MIME body which carries the voice message information; the MGCU parses the MIME body and initiates a ISUP call to the legacy CS domain by means of intercommunication between the PS domain and the CS domain, with the voice message information carried in the message parameters of the ISUP.

By transmitting the MIME body carrying the voice message information with a normal SIP message, the supplementary service control unit and the MGCU do not need to create any instance for the voice message in memory.

The method does not need special support of the SIP terminal, and is favorable for generalization of the service.

With the method, the Calling Tapping at Flash service in the PS domain can be used in a consistent way with the service in the legacy CS domain, and does not need any additional user operation; therefore, the user can use the Calling Tapping at Flash service easily and quickly.

By transmitting the MIME body carrying voice message information with a normal SIP message, the session can be released once it is terminated, and thereby it will not cause additional load to the system. It is seen from the above that the invention provides a new method of implementing Calling Tapping at Flash service in PS domain, i.e., the message information is transmitted via a MIME body contained in an SIP message body; the MIME body can be transmitted with message bodies of various SIP messages and the subscription for the voice message is not needed.

The invention has taken into account various possible cases: if the user is in the legacy CS domain while the voice mailbox is in the PS domain, the Voice Mail Application Server can actively initiate an SIP session, with the body of an SIP message containing an MIME body which carries the voice message information; the MGCU parses the MIME body and initiates an ISUP call to the legacy CS domain by means of the intercommunication between the PS domain and the CS domain, with the voice message information carried in the message parameters of the ISUP.

By transmitting the MIME body carrying the voice message information with a normal SIP message, the supplementary service control unit and the MGCU do not need to create any instance for the voice message in memory.

The method doesn't need special support of the SIP terminal, and is favorable for generalization of the service.

With the method, the Calling Tapping at Flash service in the PS domain can be used in a consistent way with the service in the legacy CS domain, and does not need any additional user operation; therefore, the user can use the Calling Tapping at Flash service easily and quickly.

By transmitting the MIME body carrying voice message information with a normal SIP message, the session can be released once it is terminated, and thereby it will not cause additional load to the system.

The invention is applicable to various possible cases and can be applied widely; the subscription for the voice message is not needed, which simplifies the processing flow of the network elements, and can facilitate user operations and use. In addition, it does not require the SIP terminal interface to support the subscription for voice message, and thereby facilitates the generalization.

DETAILED DESCRIPTION OF THE EMBODIMENTS

Figure 1:
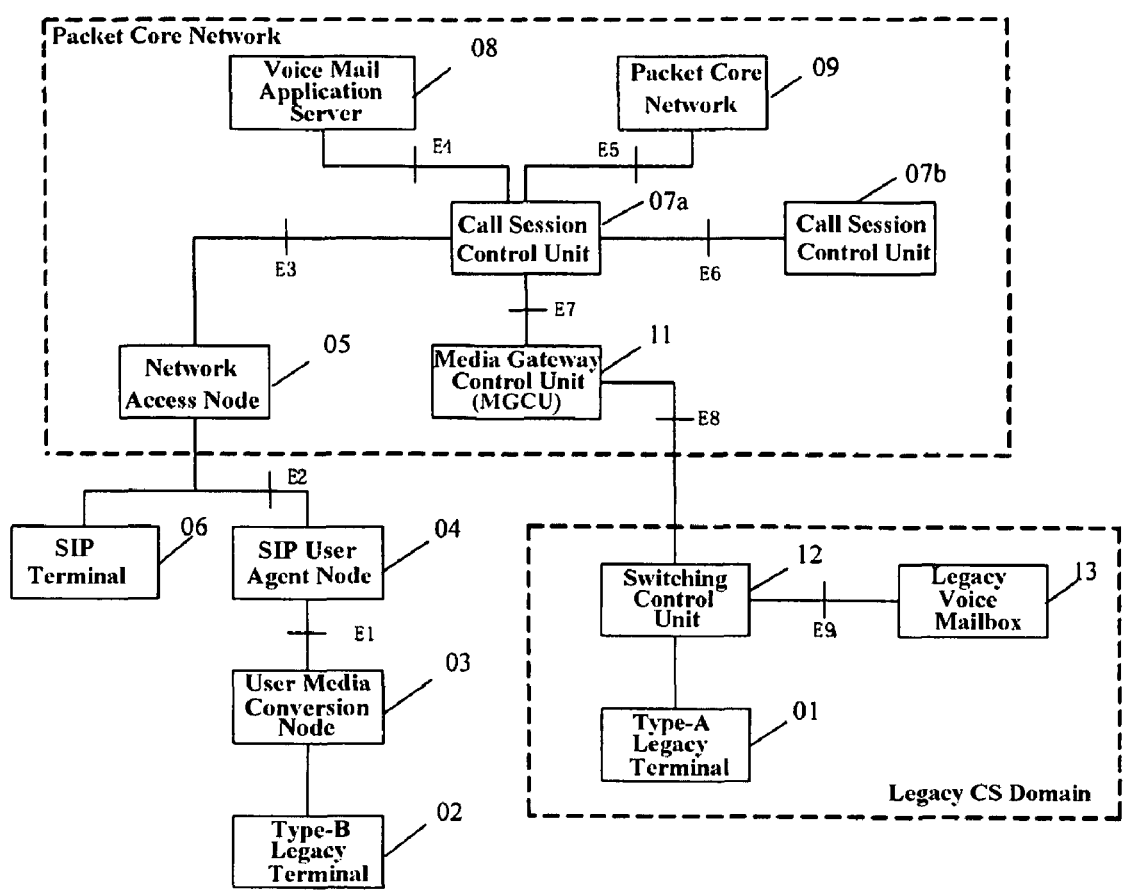
FIG. 1 is an exemplary schematic structural diagram of the communication system in the invention.

A structure of the communication system adapted to this invention is shown in FIG. 1. (FIG. 1 does not show the complete network architecture that involves all functional network elements; instead, it highlights the functional network elements related to the key technologies of the invention.) The communication system involves PS domain and CS domain, wherein Type-A legacy terminal 01 refers to a legacy terminal that accesses and is registered in the legacy CS domain, such as POTS terminal, ISDN terminal, etc.

Type-B legacy terminal 02 refers to a legacy terminal that accesses and is registered in the packet core network with SIP as the call control signaling, such as POTS terminal, ISDN terminal, etc.

User media conversion node 03 provides circuit voice/packet voice and packet voice/circuit voice conversion functions between POTS terminal and PS domain, and supports packet voice coding/decoding.

SIP user agent node 04 is an SIP user agent (SIP UA) for type-B legacy terminal 02 to access the PS domain with SIP as the call control signaling; if the user media conversion node 03 and the SIP user agent node 04 are separate network entities, the interface E1 between them employs Media Gateway Control Protocol (MGCP) (e.g., H.248); if the network access node 05 and the SIP user agent node 04 are the same network entity, the interface E1 is a user-defined internal interface.

Network access node 05 is a network node that provides registration, authentication, and authorization functions etc. for accessing the packet core network to the SIP terminal 06 and the type-B legacy terminal 02; the network access node 05 registers the SIP terminal 06 and the type-B legacy terminal 02 to different call session control units 07a and 07B respectively. When the SIP terminal 06 or the type-B legacy terminal 02 initiates a call, the network access node routes the call to the corresponding home call session control unit of the SIP terminal 06 or the type-B legacy terminal 02. If the network access node 05 and the SIP user agent node 04 are separate network entities, the interface E2 between them employs SIP; if the network access node 05 and the SIP user agent node 04 are the same network entity, the interface E2 is an SIP interface or a user-defined internal interface. Usually, when the user media conversion node 03 and the SIP user agent node 04 are separate network entities, the SIP user agent node 04 and the network access node 05 are the same network entity.

Call session control unit 07 provides call control, routing, and service triggering functions for registered users who access the packet core network. The interface E6 between the two call session control units 07a and 07b is an SIP interface. If the call session control unit 07a and the network access node 05 are separate network entities, the interface E3 between them is an SIP interface; if the call session control unit 07a and the network access node 05 are the same network entity, the interface E3 is an SIP interface or a user-defined internal interface.

Voice Mail Application Server 08 is a voice mail system that supports SIP interface; it provides voice mail service to the users and can be regarded as an SIP application server in the packet core network with SIP as the call control signaling; the interface E4 is an SIP interface.

Supplementary service control unit 09 provides various supplementary services (e.g., logic control of Calling Tapping at Flash service) to the type-B legacy terminal 02 and serves as the host execution environment for various supplementary services. If the supplementary service control unit 09 and the call session control unit 07a are separate network entities, the interface E5 between them is an SIP interface; if the supplementary service control unit 09 and the call session control unit 07a are the same network entity, the interface E5 is an SIP interface or a user-defined internal interface. Multiple supplementary service control units 11 responsible for different supplementary services are permitted.

Media Gateway Control Unit (MGCU) 11 provide intercommunication control for calls between registered users in packet core network (SIP terminal 06 and type-B legacy terminal 02) and users in legacy CS domain (type-A legacy terminal 01), and implements translation between SIP and call control signaling in legacy CS domain. If the MGCU 11 and the call session control unit 07a are separate network entities, the interface E7 between them is an SIP interface; if the MGCU 11 and the call session control unit 07a are the same network entity, the interface E7 is an SIP interface or a user-defined internal interface.

Switching control unit 12 provides call control, routing, and supplementary services (e.g., Calling Tapping at Flash service) handling to registered users (type-A legacy terminals) who access the legacy CS domain. If the switching control unit 12 and the MGCU 11 are separate network entities, the interface E8 between them is an ISUP interface; if the switching control unit 12 and the MGCU 11 are the same network entity, the interface E8 is a user-defined internal interface.

Legacy voice mailbox 13 is a voice mail system located in legacy CS domain and provides voice mail service to users; interface E9 is an ISUP interface.

In the above system, it is permitted that there is only a voice mailbox in PS domain or only a voice mailbox in CS domain.

Hereunder the implementation scheme of Calling Tapping at Flash service is described in three cases: user in PS domain, with voice mailbox in PS domain; user in PS domain, with voice mailbox in legacy CS domain; user in legacy CS domain, with voice mailbox in PS domain.

The flow diagrams and narrative descriptions in the invention are provided only to highlight the key technologies of the invention, but do not represent a complete call and service control flow or exhaust all possible branch flows; in addition, the described definition format of Multipurpose Internet Mail Extensions (MIME) body carrying voice message information in SIP message body is provided only to highlight the key technologies of the invention, and does not means the exclusive description.

Embodiment 1

Case 1: User in PS domain, with voice mailbox in PS domain.

Figure 2:
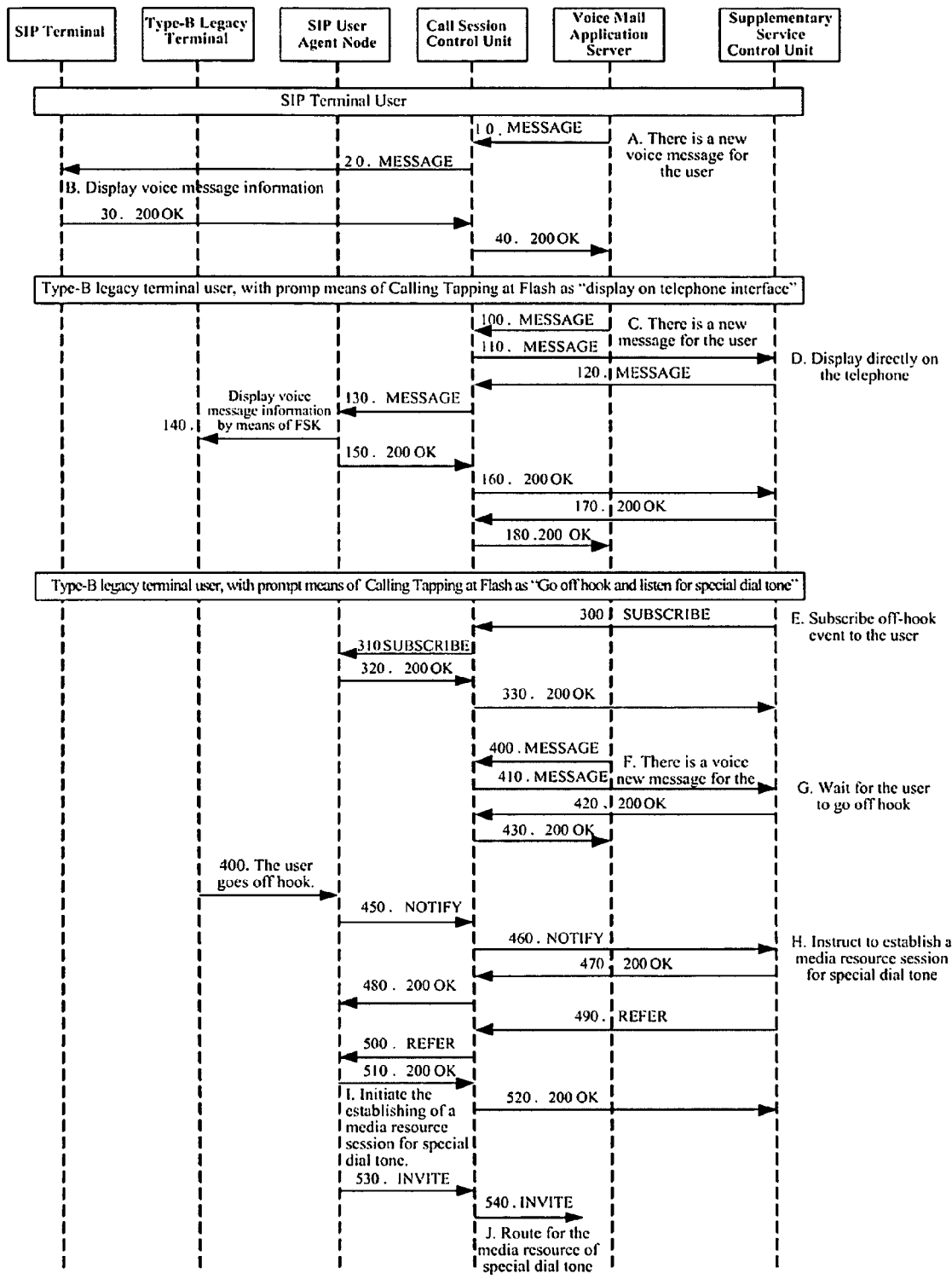
FIG. 2 is a flow diagram of the method according to an embodiment of the invention.

The user in PS domain may be an SIP terminal or a type-B legacy terminal, who has activated voice mail service, with Calling Tapping at Flash service activated by default; The Calling Tapping at Flash service flow is shown in FIG. 2.

A. Processing flow for user as SIP terminal user in PS domain:

(10) When there is a new voice message for a user in the voice mailbox of the user, the Voice Mail Application Server sends a MESSAGE message, with the user's voice message information indicated in the body of the MESSAGE message; there contains a defined MIME media type body in the body of the MESSAGE message; an instance is as follows:

MessageSummary Media Type
The medial type can be defined as follows:
Media type name: application
Media subtype name: MessageSummary-Information
Required parameters: version
Optional parameters: base
Encoding scheme: XML The parameters for the voice message information can include: number of new voice messages, number of old voice messages, and voice message account identity (target user identity); the parameters can be described in XML coding format; in the following example, the above parameters are defined in XML Schema data format:

```
<xsd:element name="newmsgs" type="xsd:positiveInteger"/
>
        <xsd:element name="oldmsgs" type="xsd:
positiveInteger" />
        <xsd:element name="msgAccountID" type="xsd:
string" />
```

Therefore, a sample of MIME body carrying voice message information, which is contained in MESSAGE message body, and described in XML format, can be:

```
<newmsgs> 2 </newmsgs>
<oldmsgs> 5 </oldmsgs>
<msgAccountID> 1234567@example.com </msgAccountID>
```

Furthermore, other information, such as number of new emergency voice messages, number of old emergency voice messages, source user identity of new voice message, and voice message time, etc., can be added into the MIME body.

(20) The call session control unit forwards the MESSAGE message;

(30) The SIP terminal receives and parses the MESSAGE message, abstracts the MIME body from the body of the MESSAGE message, displays the content of the MIME body on the terminal interface, and returns a response code 200 OK which indicates the message is received successfully;

(40) The call session control unit forwards the response code 200 OK.

B. In the case that the user is a type-B legacy terminal user in PS domain, the Calling Tapping at Flash service can be prompted by means of "display on telephone interface" or "go off hook to listen for cue tone"; hereunder the two means are described respectively.

The processing flow for prompting Calling Tapping at Flash service by means of display on telephone interface is as follows:

(100) When there is a new voice message for a user in the voice mailbox of the user, the Voice Mail Application Server sends a MESSAGE message, with the user's message information described in MIME body in the body of the MESSAGE message.

(110) The call session control unit triggers the MESSAGE message to the supplementary service control unit; the triggering can be based on the user identity of type-B legacy terminal, MESSAGE method, or MIME media type, etc.

(120) The supplementary service control unit handles the supplementary service for the type-B legacy terminal user: after the supplementary service control unit receives and parses the MESSAGE message, it treats the MESSAGE message in accordance with the user's Calling Tapping at Flash prompt means; if the prompt means is "display on telephone interface", the supplementary service control unit forwards the MESSAGE message.

(130) The call session control unit forwards the MESSAGE message.

(140) The SIP user agent node receives and parses the MESSAGE message, and forwards the MESSAGE message to the legacy terminal for displaying via appropriate signaling.

For example, if the legacy terminal is a POTS terminal that supports ringing-independent FSK, the SIP user agent node can issue the voice message information to the POTS terminal directly with a FSK signal; if the legacy terminal is an ISDN telephone, the SIP user agent node can forward the voice message information to the telephone for displaying by carrying the voice message information with relevant DSS1 signaling parameters. Wherein, if the SIP user agent node and the user media conversion node are separate network entities, the SIP user agent node forwards the message to the user media conversion node via the signaling of interface E1; then, the user media conversion node issues the message to the legacy terminal for displaying via FSK signal or DSS1 signaling.

(150) The SIP user agent node returns a response code 200 OK which indicates the voice message information is received successfully.

(160) The call session control unit forwards the response code 200 OK.

(170) The supplementary service control unit forwards the response code 200 OK.

(180) The call session control unit forwards the response code 200 OK.

If the prompt means of the Calling Tapping at Flash service is "go off hook to listen for cue tone", the supplementary service control unit subscribes "off-hook signal" event to the user through the following steps after the user activates a voice mailbox and activates the Calling Tapping at Flash service:

(300) The supplementary service control unit sends a SUBSCRIBE message to subscribe "off-hook signal' event to the user.

(310) The call session control unit forwards the SUBSCRIBE message.

(320) The SIP user agent node receives and parses the SUBSCRIBE message, creates a subscription instance for the user, and returns a response code 200 OK.

(330) The call session control unit forwards the response code 200 OK.

After the "off-hook signal" event is subscribed, the processing flow for prompting Calling Tapping at Flash service by means of "go off hook to listen for cue tone" is as follows:

(400) When there is a new voice message for a user in the voice mailbox of the user, the Voice Mail Application Server sends a MESSAGE message, with the user's voice message information described in an MIME body in the message body.

(410) The call session control unit triggers the MESSAGE message to the supplementary service control unit.

(420) The supplementary service control unit handles the supplementary service for the type-B legacy terminal user: after the supplementary service control unit receives and parses the MESSAGE message, it treats the MESSAGE message in accordance with the user's Calling Tapping at Flash prompt means; if the prompt means is "go off hook to listen for special dial tone or voice prompt", the supplementary service control unit records the user's voice message information and returns a response code 200 OK.

(430) The call session control unit forwards the response code 200 OK.

(440) The user of type-B legacy terminal goes off the hook.

(450) When the SIP user agent node receives an off-hook signal from the user, it determines whether there is a subscription instance of the "off-hook signal" event for the user; if there is, the SIP user agent node sends a NOTIFY message carrying the "off-hook signal" event.

(460) The call session control unit forwards the NOTIFY message.

(470) The supplementary service control unit receives and parses the NOTIFY message, learns that the user goes off the hook, and returns a response code 200 OK to indicate the message is received successfully.

(480) The call session control unit forwards the response code 200 OK.

(490) After the user goes off the hook, if there is a recorded voice message for the user, the supplementary service control unit instructs the SIP user agent node to establish a media resource session for a special dial tone (or voice prompt) to a third party, and sends a REFER message to indicate the third party is the media resource of the special dial tone (or voice prompt).

(500) The call session control unit forwards the REFER message.

(510) The SIP user agent node receives and parses the REFER message, and returns a response code 200 OK which indicates the message is received successfully.

(520) The call session control unit forwards the response code 200 OK.

(530) In accordance with the instruction of the REFER, the SIP user agent node initiates an SIP session initialization request with INVITE message to the third party.

(540) The call session control unit controls the routing of the INVITE message and establishes a session to the media resource of special dial tone (or voice prompt); then, the user can hear the special dial tone (or voice prompt).

Embodiment 2

Figure 3:
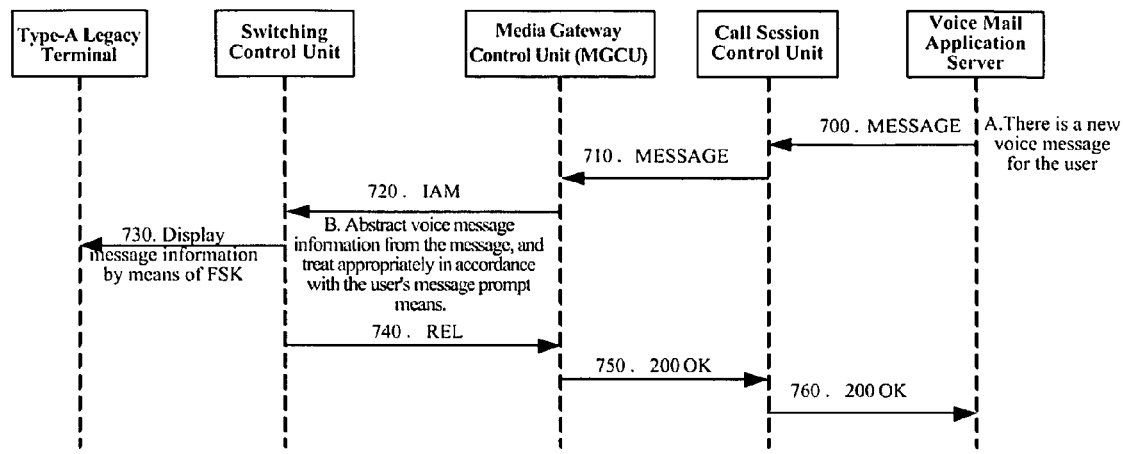
FIG. 3 is a flow diagram of the method according to another embodiment of the invention.

Case 2: User in legacy CS domain, with voice mailbox in PS domain, and the subscribed voice mailbox is a Voice Mail Application Server in the PS domain. As shown in FIG. 3, the processing flow is as follows:

(700) When there is a new voice message for the user, the Voice Mail Application Server sends a MESSAGE message, with the user's voice message information described in an MIME body in the body of the MESSAGE message.

(710) The call session control unit forwards the MESSAGE message.

(720) The MGCU receives and parses the MESSAGE message, abstracts the MIME body, converts the MIME body into MessageWaitingNotification parameter in ISUP signaling, and sends the parameter via an Initial Address Message (IAM) message.

(730) The switching control unit receives and parses the IAM message, abstracts the MessageWaitingNotification parameter and learns that there is a new voice message for the user, and treats the IAM message appropriately in accordance with the user's voice message prompt means.

If the prompt means is "display on telephone interface", when the telephone is a POTS terminal that supports ringing-independent FSK, the voice message information can be issued to the POTS terminal directly with a FSK signal; when the telephone is an ISDN telephone, the voice message information can be transmitted to the telephone for displaying by carrying the message information with relevant DSS1 signaling parameters.

If the user's prompt means is "go off hook to listen for a special dial tone or a voice prompt", the switching control unit records the user's voice message information, and sends a special dial tone or a voice prompt when the user goes off the hook.

(740) The switching control unit sends a REL message to release the ISUP call.

(750) The MGCU releases the ISUP call and returns a response code 200 OK.

(760) The call session control unit forwards the response code 200 OK.

Embodiment 3

Case 3: User in PS domain, with voice mailbox in legacy CS domain.

Figure 4:
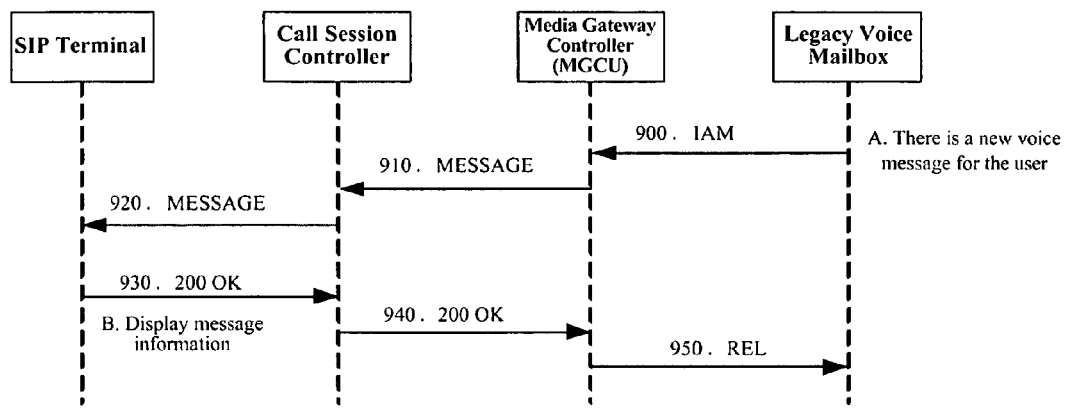
FIG. 4 is a flow diagram of the method according to a further embodiment of the invention.

The user (SIP terminal or type-B legacy terminal) are in PS domain, while the voice mailbox for the user is in the legacy CS domain. In the following flow instance, the user in PS domain is an SIP terminal (for a type-B legacy terminal, please refer to the processing flow of SIP user agent node and supplementary service control unit in the above case 1). As shown in FIG. 4 (the switching control unit is omitted between the legacy voice mailbox and the MGCU), the processing flow is as follows:

(900) When there is a new voice message for a user in the voice mailbox of the user, the voice mailbox initiates a call by sending a IAM message via ISUP signaling, with a MessageWaitingNotification parameter carried in the IAM message to indicate the user's voice message information.

(910) The MGCU receives and parses the IAM message, abstracts the MessageWaitingNotification parameter from the IAM message, converts the MessageWaitingNotification parameter into an MIME body which carries the voice message, and transmits the MIME body with a MESSAGE message.

(920) The call session control unit forwards the MESSAGE message.

(930) The SIP terminal receives and parses the MESSAGE message, abstracts the MIME body from the body of the MESSAGE message, displays the content of the MIME body information on the terminal interface, and returns a response code 200 OK which indicates the message is received successfully.

(940) The call session control unit forwards the response code 200 OK.

(950) The MGCU sends a REL message to release the ISUP call initiated by the voice mailbox.

In the processing flow shown in FIG. 4, the switching control unit can analyze and determine whether the user is a type-A legacy terminal user in CS domain; if the user is a type-A legacy terminal user in CS domain, the switching control unit converts the inter-exchange signaling message into a user signaling message and transmits the message to the user terminal, the processing procedure of which is similar to those used in the prior art and thus the description thereof is omitted.

In the above processing flows, the Calling Tapping at Flash service is implemented by transmitting an MIME body carrying the voice message information in a MESSAGE message body; however, the carrier message is not limited to MESSAGE; in SIP, there are several messages that can be used to transmit a media type of MIME body format with their message bodies; for example, the MIME body can also be transmitted in INVITE message body.

In the above case 1, when there is a new voice message for a subscribed user of the Voice Mail Application Server, the Voice Mail Application Server initiates an INVITE message; the Session Description Protocol (SDP) attribute description of the INVITE message and the SDP attribute descriptions of the subsequent SIP messages sent by the Voice Mail Application Server in the same session are blank or invalid, and the body of the INVITE message carries the MIME body which contains the voice message information; after the SIP terminal, the SIP user agent node and the supplementary service control unit in PS domain receives and parses the INVITE message, they treat the INVITE message in the same way as described above. Different from the normal session establishing flow with INVITE message, here it is unnecessary for the INVITE message to establish a media channel; the processing means for the INVITE message can be:

A. The SIP terminal, the SIP user agent node and the supplementary service control unit in PS domain treat the INVITE message carrying MIME body specially, abstract the content of the MIME body which contains the voice message information, and then release the call; or B. The SIP terminal, the SIP user agent node and the supplementary service control unit in PS domain return an SIP response code normally after they receives the INVITE message; the Voice Mail Application Server releases the call after it receives the response code.

In the inter-domain communication pattern in the above case 2, when there is a new voice message for a subscribed user in the legacy CS domain, the Voice Mail Application Server initiates an INVITE message (with or without SDP attribute description) with the MIME body carried in the body of the INVITE message; the MGCU receives and parses the INVITE message, translates the INVITE message into an IAM message, abstracts the MIME body and converts the MIME body into a MessageWaitingNotification parameter. When the switching control unit receives the IAM message, it abstracts the MessageWaitingNotification parameter and the releases the call.

In the inter-domain communication pattern in the above case 3, after the MGCU receives the IAM message from the legacy voice mailbox, it translates the IAM message into an INVITE message, converts the MessageWaitingNotification parameter into an MIME body which carries the voice message, and transmits the MIME body with the body of the INVITE message; or, the MGCU can employs the SIP-I mechanism to pack the IAM message into an MIME media type and transmits the MIME media type with the body of the INVITE message; in the latter case, the SIP terminal, the SIP user agent node and the supplementary service control unit in the PS domain are required be capable of parsing ISUP MIME body so as to abstract the relevant voice message information.

Similarly, it is unnecessary to establish a media channel for the session of the INVITE message in PS domain; the SDP attribute description of the INVITE message sent by the MGCU and the attribute descriptions of the subsequent SIP messages in the same session are blank or invalid; the processing is as follows, which is similar to that in case 1:

A. The SIP terminal, the SIP user agent node and the supplementary service control unit in PS domain treat the INVITE message carrying MIME body specially, abstract the content of the MIME body, and then release the call; or B. The SIP terminal, the SIP user agent node and the supplementary service control unit in PS domain return an SIP response code normally after they receive the INVITE message; the MGCU releases the call after it receives the response code; or the MGCU translates the response code into an appropriate ISUP message and sends the message to the voice mailbox in legacy CS domain, and the call is released by the later.

The above description describes and explains the principle of the invention. It is understood that the embodiments of the invention are not limited to those described above. Those skilled in the art can make modifications and alterations to the invention, without departing from the spirit and scope of the invention; however, any of such modifications or alterations shall fall into the protected domain of the invention. Therefore, the protected domain of the invention shall be defined by the following claims.

The invention claimed is:

1. A method for implementing Calling Tapping at Flash, comprising the following steps of:

when there is a new voice message for a user, actively initiating a Session Initiation Protocol (SIP) message which carries the description information of the new voice message by a Voice Mail Application Server;

sending the SIP message to a user terminal or a home network device of the user terminal, and notifying the user by the user terminal or the home network device;

wherein when the user is a terminal user in a Packet Service (PS) domain, said notifying the user comprises the following steps of:

triggering the SIP message to a supplementary service control unit by a call session control unit in the PS domain;

determining the prompt means of Calling Tapping at Flash of the user by the supplementary service control unit;

when the prompt means is "display on telephone interface", transmitting the SIP message to an SIP user agent node by the supplementary service control unit, parsing the SIP message and sending a prompt message by the SIP user agent node to the user terminal; and when the prompt means is "go off hook to listen for cue tone", recording the description information of the voice message in the SIP message in accordance with the presubscribed off-hook signal event by the supplementary service control unit; playing the cue tone for the voice message when the user goes off the hook.

2. The method as in claim 1, wherein after the user activates Calling Tapping at Flash service, subscribing an off-hook signal event to the user by the supplementary service control unit when it is determined by the supplementary service control unit that the prompt means of Calling Tapping at Flash of the user is "go off hook to listen for cue tone".

3. The method as in claim 1, wherein the description information of the voice message carried in the SIP message is in Multipurpose Internet Mail Extensions (MIME) format.

4. The method as in claim 3, wherein the SIP message is a MESSAGE message or an INVITE message.

5. The method as in claim 4, wherein when the SIP message sent by the Voice Mail Application Server is an INVITE message, abstracting the description information of the voice message from the INVITE message and then releasing the session by the network device in PS domain which receives the INVITE message; or converting the INVITE message into an inter-exchange signaling message by a Media Gateway Control Unit (MGCU); abstracting the parameter for the voice message from the inter-exchange signaling message and then releasing the call by a switching control unit in a Circuit Service (CS) domain when the inter-exchange signaling message is received by the switching control unit; or releasing the session by the Voice Mail Application Server when the SIP response code for the INVITE message is received at the Voice Mail Application Server.

6. The method as in claim 5, wherein a Session Description Protocol SDP) attribute description of the INVITE message and the SDP attribute descriptions of the subsequent SIP messages of the same session are blank or invalid.

7. The method as in claim 3, wherein the inter-exchange signaling message is an Initial Address Message (IAM) of ISDN User Part (ISUP).

* * * * *